United States Patent [19]
Ingard

[11] 3,952,264
[45] Apr. 20, 1976

[54] GAS LASER WITH SUPPRESSED LOW-FREQUENCY NOISE

[75] Inventor: Karl Uno Ingard, South Lincoln, Mass.

[73] Assignee: Massachusetts Institute of Technology, Cambridge, Mass.

[22] Filed: May 24, 1971

[21] Appl. No.: 146,408

[52] U.S. Cl. .................. 331/94.5 T; 331/94.5 G; 331/94.5 PE; 330/4.3; 313/199; 313/492
[51] Int. Cl.² .................. H01S 3/13; H01S 3/22
[58] Field of Search ............... 331/94.5; 330/4.3; 313/492, 193, 199

[56] References Cited
UNITED STATES PATENTS
3,402,367  9/1968  Kobayashi.......................... 331/94.5

OTHER PUBLICATIONS
Herngvist, R.C.A. Review, Vol. 30, Sept. 1969, pp. 429–433/ 433.

Johnson et al., Proceedings of the IRE, Vol. 42, No. 9, Sept. 1954, pp. 1350–1362.

Kononenko et al., Radio Engineering & Electronic Physics, Vol. 10, Dec. 1965, pp. 1950–1953.

Pupp (1933), Physikalische Zeitschrift, 34, 1933, pp. 756–761.

Primary Examiner—Robert J. Webster
Attorney, Agent, or Firm—Arthur A. Smith, Jr.; Martin M. Santa; Robert Shaw

[57] ABSTRACT

Low frequency noise in a gas laser is suppressed by providing an auxiliary cathode in proximity to the anode to provide an auxiliary gas discharge between these elements. The anode and another cathode provide a primary gas discharge for lasing operation.

4 Claims, 3 Drawing Figures

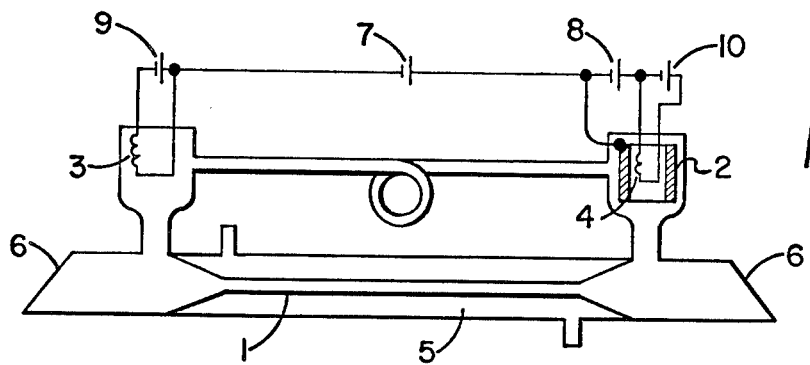
FIG. 1
FIG. 2
→ TIME 0.1 ms/cm
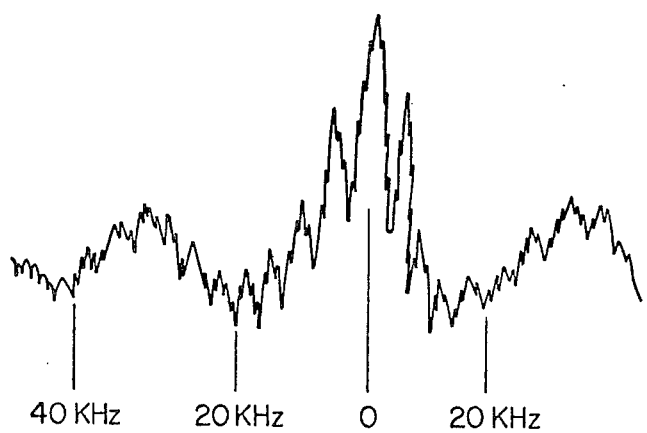
40 KHz    20 KHz    0    20 KHz
FIG. 3

GAS LASER WITH SUPPRESSED LOW-FREQUENCY NOISE

This invention was made in the course of work performed under a grant from the United States Navy, Office of Naval Research, Grant No. N00014-67-A-0204-0019.

This invention relates to apparatus for the suppression of low frequency noise in a gas laser; and more particularly, to the suppression of plasma oscillations in the gas discharge in the vicinity of the anode of the laser which gives rise to low frequency noise.

There are many applications which require that the laser output frequency be free of low frequency noise, as for example, in an argon-ion laser to be used in heterodyne spectroscopy of light scattered by ripplons or when it is desired to frequency stabilize the 5145 Angstrom laser line by using an iodine transition observed in a molecular beam as a frequency reference. Previous efforts to reduce the noise have involved a careful choice of operating parameters, such as gas pressure, discharge, current, magnetic field, tube geometry, location of electrodes, etc. This has sometimes led to relatively quiet operation of the laser.

The apparatus of this invention, which results in noise suppression, involves the use of an auxiliary cathode similar to that used by W. Pupp, *Physik. Z.* 34, 756 (1933) who showed that anode oscillations in argon could be removed with an auxiliary cathode placed within a cylindrical anode. Pupp's method for the elimination of anode oscillations was found to be effective when applied as in this invention to a modern laser device. It is believed that the low frequency noise is generated by the instability of the region of the anode where ions are pulled from the anode surface. The discharge produced by the auxiliary cathode provides an ion space charge which provides the ions for the primary discharge, thus overcoming instability.

It is therefore a primary object of this invention to provide a laser output frequency free of low frequency noise produced by anode oscillations.

The foregoing and other objects of this invention may be more fully understood from the following description, when read together with the accompanying drawings, in which:

FIG. 1 is a diagram of a gas laser discharge tube with an auxiliary cathode,

FIG. 2 is the fluctuation in the laser light caused by anode oscillations,

FIG. 3 is the frequency spectrum corresponding to the amplitude fluctuations of FIG. 2.

The laser discharge tube 1 used in the invention was made of quartz with the anode 2 and cathode 3 mounted at right angles to the tube axis. An auxiliary cathode 4 was mounted within a cylindrical molybdenum anode 2, as shown in FIG. 1. The bore diameter of the plasma tube was 3 mm and the length of the active gain region was 40 cm. In this arrangement, two independent discharges can be run simultaneously, a primary direct-current one from source 7 between the anode 2 and the heated main cathode 3, and an auxiliary one, either direct current or alternating current as determined by source 8, between the anode 2 and the heated auxiliary cathode 4. The power supplies 7,8 for the direct current discharges were filtered but not regulated. The laser tube 1 is cooled by water jacket 5 in the primary discharge region. Tube ends 6 are Brewster angle windows capable of passing the frequency of the laser. The cathodes 3,4 may be heated from either direct or alternating sources 9, 10, respectively.

With the auxiliary discharge turned off, strong coherent fluctuations in the laser light were observed. An oscilloscope picture of the corresponding output signal from a photodetector is reproduced in FIG. 2, together with the frequency spectrum obtained from a spectrum analyzer as shown in FIG. 3. The main discharge current was 15 A, the gas pressure was 350 $\mu$m, and the axial magnetic field was 350 G. The fundamental frequency was found to be independent of the main discharge current but linearly dependent on gas pressure, at least over a limited range.

With the auxiliary discharge turned on, and the current adjusted to a value above 2.5 amperes direct current, the coherent noise spectrum in FIG. 3 was completely eliminated. This occurred in the entire range of available discharge currents up to 20 amperes and magnetic fields up to 650 G in the important pressure range 200–400 $\mu$m. In this region the laser light was free from any coherent oscillations in the frequency range of the photodetector response, which was approximately 10 MHz. It was found that the auxiliary discharge current above the minimum required to eliminate noise was not critical. Also, an alternating current auxiliary discharge required to eliminate the noise was slightly larger than if direct current were used.

It is seen that for the discharge tube configuration utilized, the use of an auxiliary or secondary discharge between an auxiliary cathode and the anode makes it possible to obtain a laser operation free from coherent oscillations over a range of useful operating conditions. This range, for low values of the axial magnetic field, say less than 650 G, corresponds to argon pressures between 200 and 400 $\mu$ independent of discharge current.

Although the auxiliary cathode has been described as being within the anode, the function of the auxiliary discharge in providing an ion space charge in the vicinity of the anode for use in the primary discharge should be achievable by an auxiliary cathode merely in proximity to the anode.

Various other modifications of this invention will be apparent to those skilled in the art from the above description of the invention. The appended claims are intended to cover such modifications as are encompassed by the scope and spirit of this invention.

What is claimed is:

1. A gas discharge tube suitable for use in a laser radiation generator comprising,
    a tube,
    a gas laser medium contained in said tube,
    a cathode and anode in said tube,
    means for providing a primary electrical discharge in said gas between said cathode and said anode to provide a population inversion in said gas over a region of said tube,
    means for producing an ion space charge about said anode for providing ions for said primary electrical discharge and for suppressing low frequency noise in said laser radiation.

2. The apparatus of claim 1 wherein said ion space charge producing means comprises,
    an auxiliary cathode within said tube in proximity to said anode,
    means for providing an auxiliary gas discharge between said anode and said auxiliary cathode to produce an ion space charge about said anode.

3. The apparatus of claim 2 wherein:
said auxiliary gas discharge is a direct current discharge.
4. The apparatus of claim 2 wherein:
said auxiliary gas discharge is an alternating current discharge.

* * * * *